United States Patent [19]

Akesson et al.

[11] Patent Number: 4,945,607
[45] Date of Patent: Aug. 7, 1990

[54] GRIPPING DEVICE PARTICULARLY FOR REMOVING FISH BONES

[75] Inventors: Rune Akesson; Giuliano Pegoraro, both of Bjuv, Sweden

[73] Assignee: Nestec S.A., Vevey, Switzerland

[21] Appl. No.: 344,211

[22] Filed: Apr. 27, 1989

[30] Foreign Application Priority Data

May 13, 1988 [EP] European Pat. Off. ............ 88107722

[51] Int. Cl.⁵ ............................................ A22C 25/16
[52] U.S. Cl. .......................................... 17/56; 17/46; 17/1 G
[58] Field of Search .................. 17/56, 1 G, 70, 46

[56] References Cited

U.S. PATENT DOCUMENTS

| | | | |
|---|---|---|---|
| 3,348,261 | 10/1967 | Segur | 17/46 |
| 3,412,424 | 11/1968 | Brown et al. | 17/1 G |
| 3,541,634 | 11/1970 | Panek | 17/46 |
| 3,708,828 | 1/1973 | Cain et al. | 17/46 |
| 3,866,271 | 2/1975 | McNeil | 17/1 G |

*Primary Examiner*—Willis Little
*Attorney, Agent, or Firm*—Vogt & O'Donnell

[57] ABSTRACT

A gripping device, which is particularly useful for removing pin bones, particularly from salmonoid fish, has a pair of matable gripping jaws wherein one of the jaws is held in a fixed position relative to a cylinder and the other jaw is pivotally connected to the cylinder such that it is urged to open and close the pair of jaws. The device provides for retracting and extending the gripping jaws.

16 Claims, 1 Drawing Sheet

GRIPPING DEVICE PARTICULARLY FOR REMOVING FISH BONES

BACKGROUND OF THE INVENTION

The present invention relates to a device for removing the pin bones from salmonoid fish such as salmon, rainbow trout, Pacific salmons etc., all of which will be referred to as salmon in this invention.

There are about forty pin bones in salmon, which traverse the meat. Since salmon is expensive, it is extremely important to remove the pin bones without removing substantial quantities of meat also. Since the pin bone cannot be cut off, it has to be pulled out and this is currently done manually using a gripping tool with jaws and handles on a pivot, e.g., pincers. However, this is not only time-consuming but also very tiring.

SUMMARY OF THE INVENTION

We have now developed a device which works on the same principle as pincers, but which is significantly easier and quicker to operate, in which the jaws are automatically operated by a cylinder instead of manually by the handles. By "cylinder" in this invention we mean a hollow cylinder having a piston working inside it.

Accordingly, the present invention provides a device for removing pin bones from salmon comprising a pair of jaws one of which is fixed and the other pivoted to which is connected a first cylinder adapted to urge it to open or closed positions, means for activating the first cylinder and means for retracting the pair of jaws in the closed position so that when gripping a pin bone embedded in the salmon, the pin bone may be pulled out of the salmon.

The present invention also provides a method of removing pin bones from salmon by means of a device as hereinbefore described which comprises positioning the device above a salmon fillet at the location of a pin bone so that a pin bone is positioned between the open jaws, operating the means for activating the first cylinder so that the first cylinder urges the pivoted jaw to the closed position to grip the pin bone between the two jaws, operating the means to retract the pair of jaws, gripping the pin bone to pull the pin bone out of the salmon, withdrawing the device from the salmon and releasing the means for activating the first cylinder causing the pivoted jaw to pass to the open position to release the pin bone.

DETAILED DESCRIPTION OF THE INVENTION

In the present invention the means for activating the first cylinder may, for instance, be an electrical switch but is preferably a valve, for example, a pneumatic valve. Conveniently, provision for operating the means for activating the first cylinder is furnished, for example, by means which may be pressed manually.

The device is conveniently enclosed within a housing.

The fixed jaw is conveniently firmly connected to the first cylinder advantageously through a firm connecting means attached to the first cylinder. The pivoted jaw is conveniently pivotally connected to the first cylinder and advantageously the rear part of the pivoted jaw is pivotally connected via a connecting means to the piston rod of the first cylinder so that the pair of jaws, connecting means and piston rod form a unit attached to the first cylinder. The connecting means for the pivoted jaw may conveniently consist of a pin passing through the pivoted jaw and a clevis connected to the piston rod. The forward stroke of the piston urges the pivoted jaw to the open position, and the backward stroke of the piston pulls the pivoted jaw to the closed position.

The activation of the first cylinder, for instance by pressing a lever to operate a valve, which would take place when a pin bone is located between the pivoted jaws in the open position, causes the piston to move backwards and urge the pivoted jaw to the closed position to grip the pin bone.

The means for retracting the pair of jaws in the closed position and for extending the jaws linearly is conveniently provided by a second cylinder substantially parallel to the first cylinder and connected by its piston to either the first cylinder or a part of the unit attached to the first cylinder. The activation of the means for retracting and extending the pair of jaws may also be caused by the means for activating the first cylinder, for example, a valve, which causes the piston of the second cylinder to move backwards.

The backward stroke of the piston of this second cylinder causes the first cylinder or the unit attached to the first cylinder to travel away from the salmon which enables the pivoted jaws to pull out a pin bone while gripping it while the forward stroke of the piston causes the first cylinder to travel towards the salmon.

Advantageously, there is a time valve which controls the timing of the operation of the means for retracting the pair of jaws in the closed position to ensure that the pin bone is pulled out of the salmon only after the pivoted jaw has passed to the closed position. Preferably, the delay time can be adjusted to ensure that the pin bone is securely gripped before it is pulled out of the salmon.

Preferably, there is provided a means for deactivating the first cylinder so that, after retracting the pair of jaws, deactivation of the first cylinder, for example, by releasing the lever for operating the means for activating the first cylinder causes the piston of both the first cylinder, and the second cylinder if present, to move forwards. The forward stroke of the piston of the first cylinder causes the pivoted jaw to return to the open position and, preferably, there is a means for blowing out the pin bone from between the open jaws to ensure its complete release. Such a means may conveniently be provided by a small blow pipe connected to, and actuated by, the valve means. The forward stroke of the piston of the second cylinder causes the unit attached to the first cylinder to travel towards the salmon and the pair of open jaws can be positioned above another pin bone.

The present invention is illustrated further with reference to the accompanying drawings.

DETAILED DESCRIPTION OF THE DRAWINGS

Figure 1:
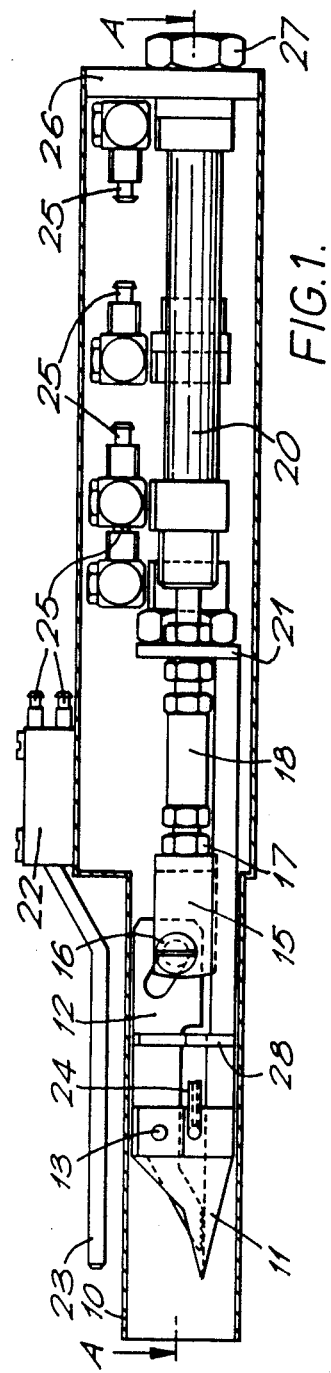
FIG. 1 represents a diagrammatic sectional side view of a device of the present invention with the jaws closed in the position immediately after having pulled out a pin bone.

The device comprises a housing 10, a fixed jaw 11 and a pivoted jaw 12 pivoted by means of a pin 13. The pivoted jaw is attached to the piston rod of a first cylinder 14 by means of a clevis 15 and a pin 16 via a nut 17, a spacing bar 18 and a nut 19. A second cylinder 20 is connected to the first cylinder 14 by means of a plate 21. A pneumatic valve 22 is operated by a lever 23. A blow pipe 24 is positioned between the jaws 11 and 12. Hose connectors 25 for connecting air hoses from the pneumatic valve to the cylinders are present and a holder 26 for the housing is secured by a nut 27. The fixed jaw is attached to lugs 28 which themselves are connected by means of longitudinal bars 29 to the plate 21.

Thus, as described above and as is illustrated in the drawings, the retractable gripping device of the present invention has first and second matable jaw members. Means having a pivot connecting a first jaw member 12 to a cylinder 14 such that, in operation, the cylinder and connecting means urge the first jaw member to open and close the jaws. As also described and illustrated, means are provided for maintaining the second jaw member 11 in a fixed position relative to the cylinder, as well as means for activating and deactivating the cylinder for closing and opening the jaws and means for linearly retracting and extending the jaws, the jaw opening and closing cylinder, the connecting means and the maintaining means.

Figure 2:
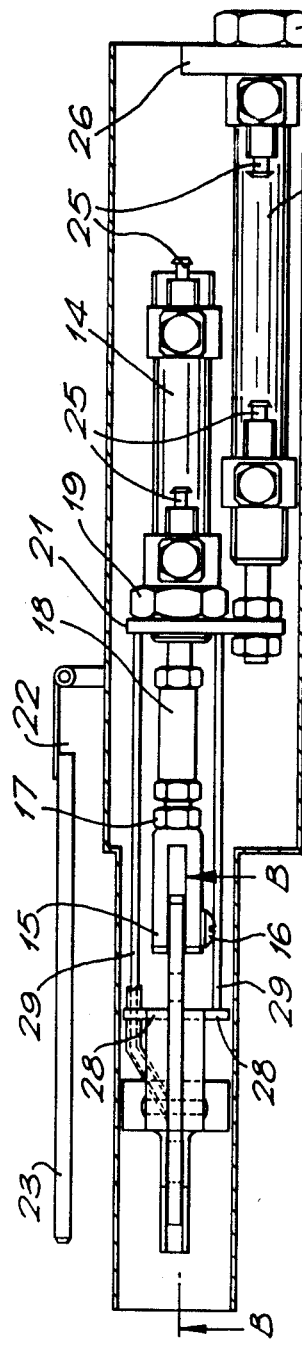
FIG. 2 represents a diagrammatic sectional side view looking in the direction A—A of FIG. 1.
Figure 3:
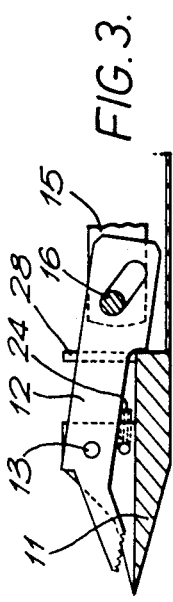
FIG. 3 represents a diagrammatic sectional side view of a pair of jaws in the open position looking in the direction B—B of FIG. 2.

In operation, the device is held by the holder 26 vertically downwards with the lever released so that both pistons of the cylinders 14 and 20 are in the forward position with the jaws 11, 12 open and their tips protruding about 15 mm beyond the edge of the housing 10 above a salmon fillet. When a pin bone is located, the end of the device is moved so that the pin bone is positioned between the jaws 11 and 12. The lever 23 is then pressed to actuate the pneumatic valve 22 in order to operate a time valve (not shown) and cause initially the piston of the first cylinder 14 to move backwards to urge the pivoted jaw 12 to the closed position so that the pin bone is firmly gripped between the jaws, and then cause the piston of the second cylinder to move backwards to pull the unit attached by the plate 21 to the first cylinder 14 upwards so that the jaws pull out the pin bone. The use of the time valve ensures that the pin bone is firmly gripped before it is pulled out. The tips of the jaws are now within the housing 10 as in the position shown in FIGS. 1 and 2. After the pin bone has been pulled out, the device is withdrawn from the salmon fillet, and the lever 23 is released so that the pistons of the cylinders 14 and 20 return to their original forward positions. The piston of the cylinder 14 travels to the forward position urging the pivoted jaw 12 to the open position while, at the same time, the pin bone is blown out by the small pipe 24. The piston of the cylinder 20 travels to the forward position causing the unit attached by the plate 21 to the first cylinder 14 to move downwards so that the tips of the jaws 11, 12 protrude about 15 mm beyond the edge of the housing 10. The device is now ready to pull out the next bone.

We claim:

1. A retractable gripping device comprising:
    first and second matable jaw members;
    means having a pivot connecting the first jaw member to a cylinder such that, in operation, the cylinder and connecting means urge the first jaw member to open and close the jaws;
    means for maintaining the second jaw member in a fixed position relative to the cylinder;
    means for activating and deactivating the cylinder for closing and opening the jaw members; and
    means for linearly retracting and extending the jaws, the jaw opening and closing cylinder, the connecting means and the maintaining means.

2. A device according to claim 1 wherein the means for maintaining the second jaw member in the fixed position relative to the jaw opening and closing cylinder includes a plate connected to the jaw opening and closing cylinder.

3. A device according to claim 1 or 2 wherein the means for retracting and extending the jaws, the jaw opening and closing cylinder, the connecting means and the maintaining means is a second cylinder.

4. A device according to claim 3 wherein the second cylinder is connected to the jaw opening and closing cylinder.

5. A device according to claim 3 wherein the second cylinder is connected to the plate.

6. A device according to claim 5 wherein the second cylinder is positioned adjacent and parallel to the jaw opening and closing cylinder.

7. A device according to claim 1 or 2 further comprising a blow pipe positioned between the jaws.

8. A device according to claim 3 further comprising a blow pipe positioned between the jaws.

9. A device according to claim 1 wherein the means for activating and deactivating the jaw opening and closing cylinder is a pneumatic valve.

10. A device according to claim 1 further comprising means for operating the means for activating and deactivating the jaw opening and closing cylinder.

11. A device according to claim 10 wherein the operating means is a lever.

12. A device according to claim 1 wherein the means for activating and deactivating the jaw opening and closing cylinder activates the means for retracting and extending the jaws.

13. A device according to claim 1 wherein the jaws are retracted in a closed position further comprising a time valve for controlling timing of operation of the retracting and extending means for ensuring that the jaw members are in a closed position before retracting the jaws.

14. A process for removing pin bones from salmon comprising:
    positioning a device having:
        first and second matable jaw members;
        means having a pivot connecting the first jaw member to a cylinder such that, in operation, the cylinder and connecting means urge the first jaw member to open and close the jaws;
        means for activating and deactivating the cylinder for closing and opening the jaws; and
        means for linearly retracting and extending the jaws, the jaw opening and closing cylinder, the connecting means and the maintaining means
    in a salmon fillet at a location of a pin bone such that the jaws are open and such that the pin bone is positioned between the open jaws;
    operating the cylinder activating means for closing the jaws about the pin bone to grip the pin bone between the two jaws;

operating the extending and retracting means for retracting the jaws for pulling the gripped pin bone from the fillet;
withdrawing the device from the fillet; and
deactivating the cylinder means for opening and closing the jaws for opening the jaws for releasing the pin bone from the jaws.

15. A process according to claim 14 further comprising upon opening the jaws for releasing the pin bone, blowing the pin bone from the device.

16. A process according to claim 15 further comprising operating the extending and retracting means for extending the jaws while blowing the pin bone from the device.

* * * * *